Sept. 17, 1963
G. A. WOOD, JR
3,104,075
FISHING REEL
Filed Oct. 6, 1959
2 Sheets-Sheet 1
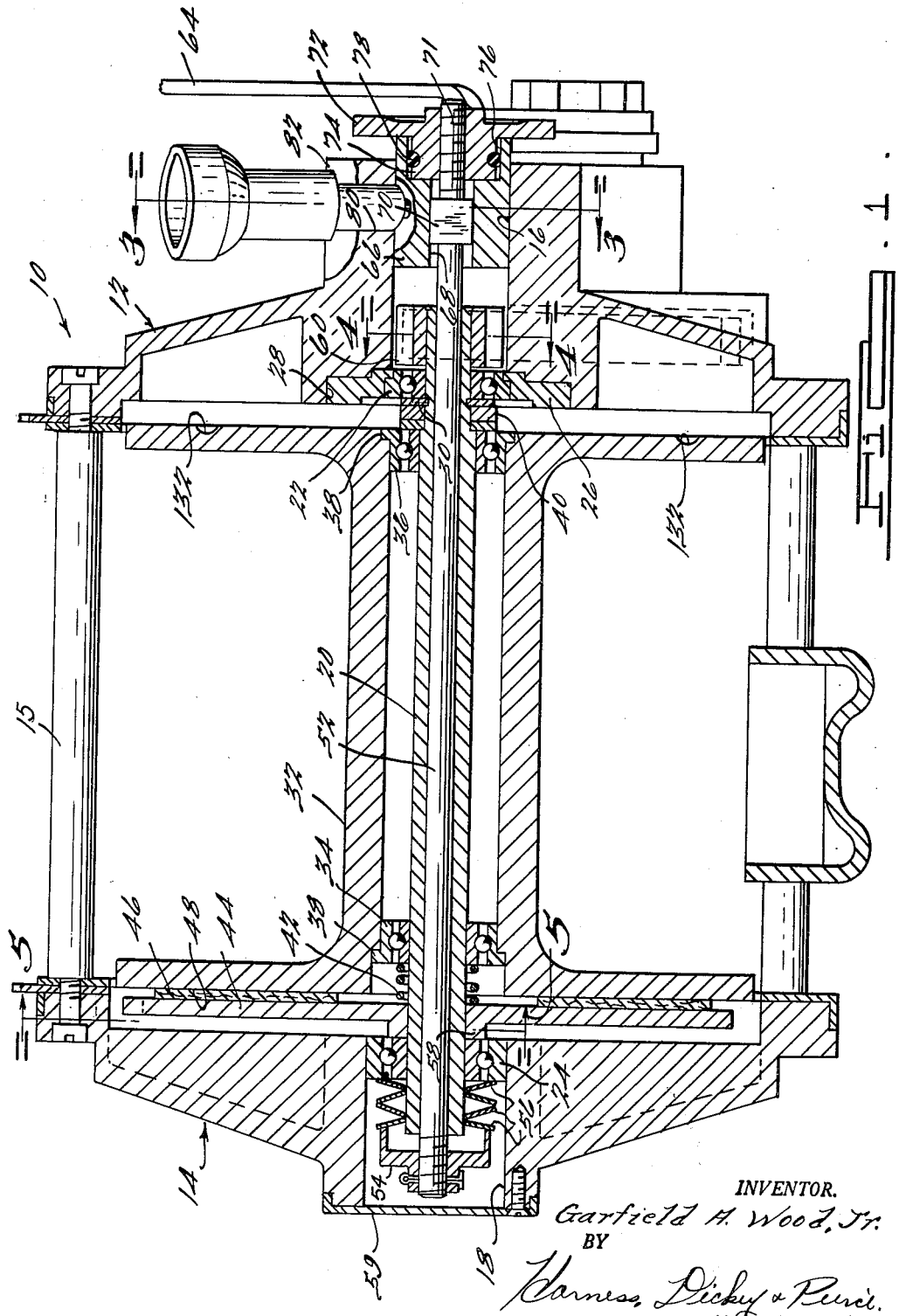
INVENTOR.
Garfield A. Wood, Jr.
BY
Harness, Dickey & Pierce
ATTORNEYS Sept. 17, 1963     G. A. WOOD, JR     3,104,075
FISHING REEL
Filed Oct. 6, 1959     2 Sheets-Sheet 2
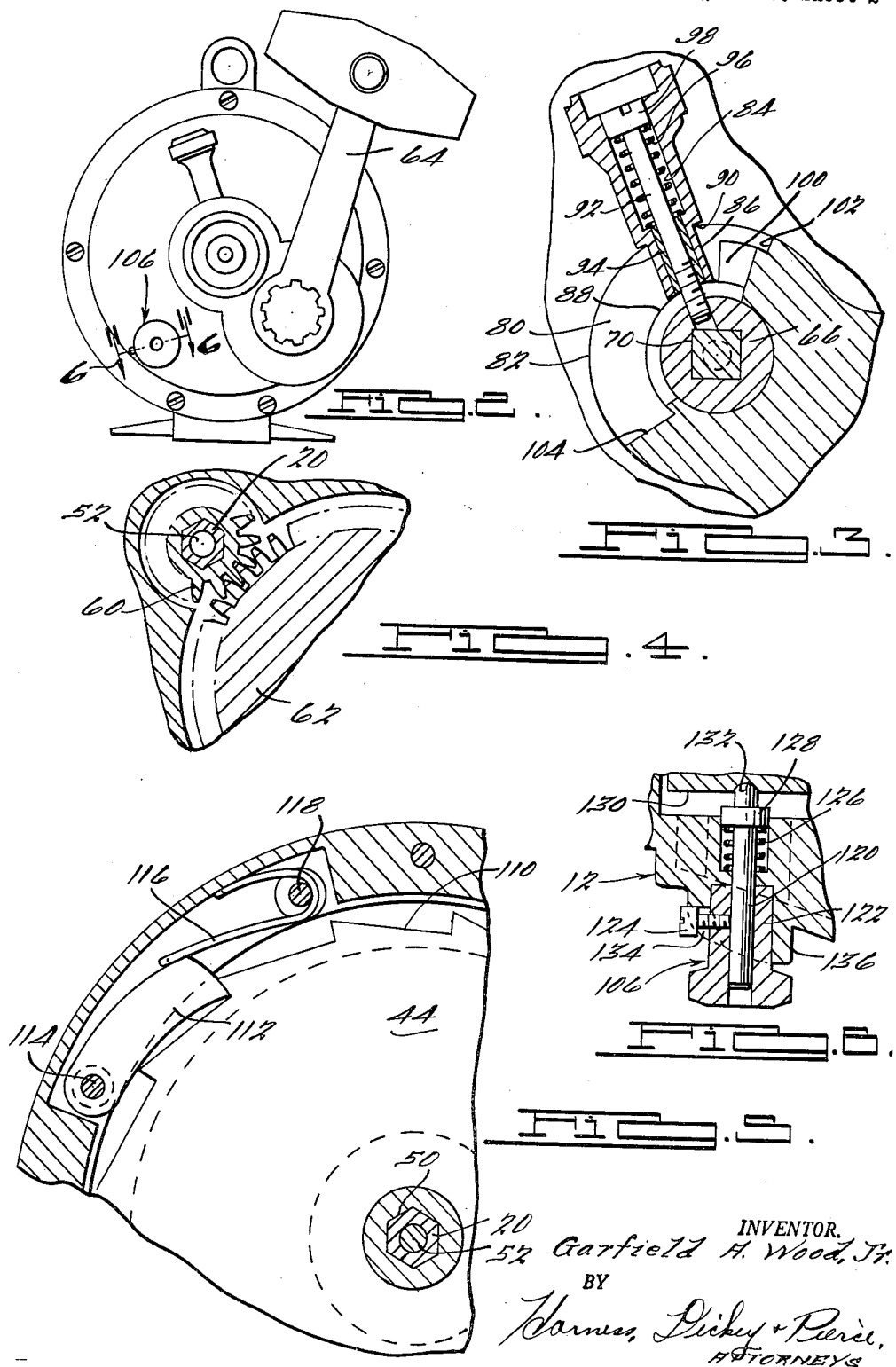
INVENTOR.
Garfield A. Wood, Jr.
BY
Harness, Dickey & Pierce,
ATTORNEYS

United States Patent Office 3,104,075
Patented Sept. 17, 1963

3,104,075
FISHING REEL
Garfield A. Wood, Jr., 4565 Sable Palm Road,
Bay Pointe, Miami, Fla.
Filed Oct. 6, 1959, Ser. No. 844,740
11 Claims. (Cl. 242—84.54)

This invention relates to fishing reels and more particularly to a cam actuated brake mechanism for a fishing reel.

In my copending application Serial No. 697,670, filed on November 20, 1957, now Patent No. 3,017,135, a fishing reel is disclosed having a disc shaped brake engaging one side of the spool. The brake is actuated by a screw mechanism disposed in the housing adjacent the other side of the spool, and the handle for rotating the spool is located in the same housing as the mechanism for actuating the brake. Since the brake is disposed on the opposite side of the spool from the mechanism for rotating the spool and actuating the brake, it can directly engage the side of the spool over a large braking area to provide a good, smooth and rugged braking action.

It is one object of the present invention to provide an improved fishing reel and brake mechanism of the general type disclosed in my copending application which is more simple in construction, has fewer parts, and which is rugged, smooth and dependable in operation.

It is another object of the invention to provide an improved fishing reel and brake mechanism of the type disclosed in my copending application wherein the maximum braking force exerted by the brake on the spool can be quickly pre-set and camming means is provided for quickly varying the braking force from zero to an intermediate force just short of the maximum pre-set force, the camming means being movable after a simple manipulation to quickly increase the braking force from the intermediate force to the pre-set maximum force.

Other objects and features of novelty of the invention will be specifically pointed out or otherwise become apparent when referring, for a better understanding of the invention, to the following description taken in conjunction with the accompanying drawings wherein:

FIGURE 1 is a sectional view of a fishing reel embodying features of the present invention;

FIG. 2 is a reduced end view of the structure illustrated in FIG. 1, as viewed from the right end thereof;

FIG. 3 is a sectional view of the structure illustrated in FIG. 1, taken along the line 3—3 thereof;

FIG. 4 is a sectional view of the structure illustrated in FIG. 1, taken along the line 4—4 thereof;

FIG. 5 is a sectional view of the structure illustrated in FIG. 1, taken along the line 5—5 thereof, and FIG. 6 is a sectional view of the structure illustrated in FIG. 2, taken along the line 6—6 thereof.

Referring to FIG. 1, a preferred embodiment of the present invention is illustrated which is comprised of circular end housings 12 and 14 fixed in parallel spaced-apart relationship by a plurality of rods 15 bolted about the periphery thereof. Each of the housings 12 and 14 have coaxially aligned central apertures 16 and 18 extending therethrough, and a hollow shaft 20 extends between the housings with one end thereof rotatably supported in the central aperture 16 by a radial thrust bearing 22 and the other end thereof rotatably supported in the central aperture 18 by a radial thrust bearing 24. The bearing 22 is supported in the housing 12 by a circular element 26 which is suitably secured within a counter-bore 28 in the left face of the housing by bolts or the like. A split ring 30 is fixed within a groove in the hollow shaft 20 and abuts against the inner race of the bearing 22 to prevent axial movement thereof.

A spool 32 is rotatably mounted on the hollow shaft 20 by ball bearings 34 and 36 having flanges 38 thereon to position the spool 32 axially. A spacer 40 is provided between the bearing 36 and the snap-ring 30 and a spring 42 is provided between the bearing 34 and a disc-shaped brake 44. The spring 42 urges the bearings 34 and 36 to the right against the spacer 40, and also urges the brake 44 to the left against the inner race of the bearing 24. This arrangement normally maintains the brake 44 just out of engagement with friction material 46 secured to the left face 48 of the spool 32 to enable the spool 32 to free-spool as will be described.

As most clearly illustrated in FIG. 5, the left end of the hollow shaft 20 has a plurality of flats 50 and the brake 44 is slidably keyed to the left end of the shaft 20 by these flats. A rod 52 is slidably disposed within the hollow shaft 20 with the left end thereof projecting into the central aperture 18 of the housing 14 and the right end thereof projecting into the central aperture 16 of the housing 12. A cup-shaped element 54 is screwed onto the left end of the shaft 52 and a plurality of resilient frusto-conical washers 56 are positioned between the cup-shaped element 54 and the outer race of the radial thrust bearing 24, the inner race of the bearing 24 abutting against hub 58 of the brake 44 as previously mentioned. With this construction, the rod 52 can be moved to the right as viewed in FIG. 2 and as will be discussed in greater detail, to compress the washers 56 which resiliently urge the bearing 24 and brake 44 to the right to increase the frictional engagement between the brake and the friction material 46 secured to the left face of the spool 32. A cover plate 59 is secured to the housing 14 to cover the left end of the central aperture 18.

Referring to FIGS. 1, 2 and 4 in particular, a pinion 60 is fixed to the right end of the hollow shaft 20 and is drivingly engaged by a spur gear 62 rotatably mounted in the housing 12. A handle 64 is rotatably mounted on the housing 12 and connected to the spur gear 62 to rotate the spur gear which, in turn, rotates the pinion 60, the hollow shaft 20 and the brake 44 which is slidably keyed to the hollow shaft as previously described. Of course when the brake 44 is frictionally engaged with the frictional material 46 on the spool 32, as will be described, rotation of the handle 64 will rotate the spool, and when the brake 44 is moved just out of frictional engagement with the spool 32 by the spring 42, as will also be described in greater detail, the spool will free-spool on the hollow shaft 20 to permit casting.

The right end of the rod 52 extends through a bushing 66 rotatably journaled in the central aperture 16 of the housing 12 in a manner to permit it to slide axially within the central aperture 16. The bushing 66 has a square or otherwise non-round central aperture 68 and the shaft 52 has a complementary square or non-round flange 70 thereon to slidably key the shaft 52 to the bushing 66. The extreme right end of the rod 52 has a threaded portion 71 and an adjusting knob 72 having a hub 74 fitting within a counter bore 76 in the right face of the bushing 66 is screwed onto the threaded portion. A suitable O-ring 78 or the like is disposed between the hub 74 and the wall of the counter bore 76 to frictionally resist relative rotation between the knob 72 and bushing 66 unless the knob is manually rotated to overcome the friction provided by the O-ring 78.

Referring particularly to FIGS. 1 and 3, a spiral camming groove 80 is formed in a central hub 82 projecting outwardly from the housing 12 which communicates with the central aperture 16. A camming lever 84 having a reduced end portion 86 projects radially from the hub 82 with the reduced end portion 86 thereof disposed within the camming groove 80. The lower end of the reduced end portion 86 rides on an internal radially outward presenting curved shoulder 88 of the camming groove, and a shoulder 90 between the reduced end portion 86 and the upper portion of the lever 84 rides on the periphery of the hub 82. A bolt 92 or the like is slidably disposed within a bushing 94 fixed within the reduced end portion 86 of the lever 84 and threadably engages the bushing 66 to secure the lever 84 thereto. A spring 96 is disposed over the bolt 92 between the bushing 94 and a head 98 to resiliently urge the lever 84 downwardly as viewed in FIG. 3 to maintain the shoulder 90 and the end of the reduced end portion 86 in engagement with the periphery of the hub 82 and the curved shoulder 88, respectively.

With this construction, the lever 84 can be pivoted in a clockwise direction as viewed in FIG. 3 until the reduced end portion 86 thereof strikes projections 100 projecting inwardly from either side of the camming groove 80. The projections 100 are spaced apart a greater distance than the diameter of the bolt 92 and a smaller distance than the diameter of the reduced end portion 86 so that the lever 84 can only pass by the projections 100 by pulling upwardly on the lever to compress the spring 96 until the bottom of the reduced end portion 86 clears the top of the projections 100. The lever 84 can then be pivoted further in a clockwise direction with the bolt 92 passing between the projections 100 until the reduced end portion 86 strikes a radial shoulder 102 defining the end of the camming groove 80.

With this construction, the lever 84 can be moved in a clockwise direction as viewed in FIG. 3 to cam the rod 52 to the right as viewed in FIG. 1, and the knob 72 can be rotated to also pull the rod 52 axially to the right to compress the resilient washers 56 which, in turn, resiliently urge the brake 44 against the friction material 46 on the spool with a greater force. In this manner, the maximum braking force desired can be pre-set by adjusting the knob 72 with the lever 84 in its extreme clockwise position so that the spool 32 will slip against the force exerted by the brake 44 when a fish exerts a sufficient force on the line to prevent the fishing line from breaking. Once the maximum braking pressure is pre-set in this manner, the lever 84 can be pivoted in a counterclockwise direction as viewed in FIG. 3 until the reduced end portion 86 thereof abuts a radial shoulder 104. When pivoted in this counterclockwise direction, the entire lever 84 is shifted to the left as viewed in FIG. 1 by the spiral camming groove 80 which, of course, also shifts the bushing 66 to the left.

Due to the fact that the resilient washers 56 are under compression, the rod 52 is, of course, spring urged to the left so that in effect the movement of the bushing 66 to the left by the counterclockwise pivoting of the lever 84 reduces this compressive force by enabling the rod 52 to shift to the left. Of course, the adjusting knob 72 will move to the left with the bushing 66 since it is always maintained in abutting engagement with the right end of the bushing by the spring biasing force exerted on the rod 52. In moving the rod 52 to the left in this manner, a point will be reached where the spring 42 will overcome the biasing force of the resilient washers 56 and will move the brake 44 just out of engagement with the friction material 46 to permit the spool 32 to free-spool and to maintain a small spring bias on the rod 52 which continues to urge the rod to the left and maintain the adjustment knob 72 in abutting engagement with the right end of the bushing 66.

When the spool 32 is in this free-spooling position, the fishing reel is, of course, ready for casting, and the spool wiill freely rotate to permit the line to be payed out in response to the cast. As soon as a fish is caught and the spool begins to rotate relative to the housing 12, a suitable clicker mechanism 106, most clearly illustrated in FIGS. 2 and 6, makes a clicking noise to alert the fisherman who may then begin to fight the fish by moving the camming lever 84 in a clockwise direction, as viewed in FIG. 3 to increase the braking pressure applied by the brake 44.

The projections 100 on the sides of the camming groove 80 prevent the fisherman from unintentionally moving the lever 84 to the maximum braking position in his excitement by stopping the lever short of the radial shoulder 102. However, to advance the lever 84 against the shoulder 102 to apply the maximum braking pressure, the lever is simply lifted to compress the spring 96 until the lower end of the reduced end portion 86 clears the top of the projection 100. The lever can then be further pivoted until the reduced end portion 86 abuts against the radial shoulder 102, at which position the maximum pre-set braking force will be applied. With this construction, the possibility of the fisherman excitedly applying the maximum braking pressure is prevented to reduce the likelihood of breaking the fishing line.

Referring to FIG. 5, it will be observed that the brake 44 has a plurality of ratchet teeth 110 on the periphery thereof which are engaged by a ratchet finger 112 pivotally mounted on the housing 14 by a pin 114 or the like. A spring 116 is also secured to the housing 114 by a pin 118 to resiliently urge the ratchet finger 112 into engagement with the ratchet teeth 110 and thus prevent rotation of the brake 44 in a counterclockwise direction. When the fishing line is being reeled in, the brake is rotated by the hollow shaft 20 in a clockwise direction to rotate the spool 32 by virtue of the frictional engagement therebetween as described. In addition, the ratchet finger and teeth provide an anti-reverse mechanism which prevents rotation of the spool in a counterclockwise direction by a running fish, for example, even though the handle 64 is not held by the fisherman. Of course, if the fish exerts a sufficient force on the fishing line to overcome the frictional engagement between the brake 44 and the friction material 46 on the left face of the spool, the spool will still slip as previously described. Further, if it is desired to turn the fishing reel around for operation by a left-handed fisherman, for example, the brake 44 may simply be reversed so that the ratchet teeth 110 face in the opposite direction, and the ratchet finger 112 may be mounted on the pin 118 and the spring 116 mounted on the pin 114. With this simple change, the brake 44 is adapted to rotate the spool in a counterclockwise direction as viewed in FIG. 5 in response to counterclockwise rotation of the handle 64, and the ratchet finger 112 again acts as an anti-reverse mechanism to prevent rotation of the brake 44 in a clockwise direction.

As most clearly illustrated in FIG. 6, the clicker mechanism 106 comprises a plunger 120 having one end thereof fixed within a bushing 122 by a setscrew 124. A spring 126 is disposed about the plunger 120 and acts on a flange 128 thereof to urge the other end of the plunger into sliding engagement with the right face 130 of the spool in position to engage a plurality of spaced detents 132 to provide the desired clicking noise. The setscrew 124 rides on a spiral camming shoulder 134 formed on the end of a boss 136 projecting from the housing 12. With this arrangement, when the bushing is rotated in a clockwise direction as viewed in FIG. 2, the camming shoulder 134 and setscrew 124 cooperate to cam the bushing 122 and spring-mounted plunger 120 outwardly to compress the spring, which, of course, moves the spring-mounted plunger to a position wherein it will not engage the detent to make the clicking noise.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:
1. In a fishing reel, a pair of spaced end plates secured together in spaced relation, a hollow shaft rotatably sup- ported by said plates, a spool mounted for rotation with its axis coinciding with the axis of said hollow shaft, means for driving said hollow shaft in rotation, a drag clutch axially movable on one end of said hollow shaft in driving relation therewith, a rod extending through said hollow shaft, spring means acting between said drag clutch and the end of said rod adjacent to said one end of the hollow shaft, connecting means disposed over the other end of said rod, stop means, and camming means for shifting said connecting means axially to vary the loading on said spring means so as to vary the frictional engagement of the drag clutch, said connecting means including preset means for adjusting said rod axially relative to said camming means when engaging said stop means to preset the maximum spring loading that can be obtained by shifting the connecting means axially each time said camming means is advanced against said stop means thereafter.

2. The invention as defined in claim 1 wherein said connecting means comprises a bushing disposed over said other end of the rod and rotatably and slidably mounted in the end plate associated with said other end, and said preset means adjusts the axial position of the rod relative to the bushing.

3. The invention as defined in claim 2 wherein said drag clutch comprises a disc slidably keyed to said one end of the hollow shaft for movement into and out of frictional engagement with the side of the spool adjacent thereto, and including a plurality of ratchet teeth formed on the periphery of said disc, a ratchet finger pivotally mounted on the end plate adjacent to said side of the spool, and spring means for resiliently urging said ratchet finger into engagement with said ratchet teeth.

4. In a fishing reel, a pair of spaced end plates secured together in spaced relation, a hollow shaft rotatably supported by said plates, a spool mounted for rotation relative to said hollow shaft, means for driving said hollow shaft in rotation, a drag clutch axially movable on one end of said hollow shaft in driving relation therewith, a rod extending through said hollow shaft, spring means acting between the drag clutch and the end of said rod adjacent to said one end of the hollow shaft, and a camming surface on the end plate adjacent to the other end of said rod, a camming member slidably engaging said camming surface, connecting means for connecting said camming member to said rod to shift the rod axially in response to sliding movement between the camming member and camming surface to vary the spring loading on said drag clutch, said connecting means embodying preset means for adjusting the axial position of said rod relative to said connecting means to preset the maximum spring loading that can be obtained by actuating said camming member.

5. In a fishing reel, a pair of spaced end plates secured together in spaced relation, a hollow shaft rotatably supported by said plates, a spool mounted for rotation on said hollow shaft, means for driving said hollow shaft in rotation, a drag clutch axially movable on one end of said hollow shaft in driving relation therewith, a rod extending through said hollow shaft, spring means acting between the drag clutch and the end of said rod adjacent to said one end of the hollow shaft, camming means on the end plate adjacent to the other end of said rod for shifting said rod axially to vary the spring loading on said drag clutch, said camming means comprising a bushing rotatably and slidably mounted in said end plate and disposed over the other end of said rod, a camming groove in said end plate, a camming lever projecting from said bushing through said camming groove so that pivotal movement of said lever rotates the bushing axially, and preset means for adjusting the axial position of said rod relative to said bushing to preset the maximum spring loading that can be imposed on the drag clutch in response to pivotal movement of said camming lever.

6. The invention as defined in claim 5 including stop means for stopping said camming lever after it has pivoted through less than the entire length of said camming groove, and means for enabling said camming lever to be pivoted past said stop means to the end of said spiral groove.

7. A fishing reel comprising a first and second end plate, means for connecting said end plates together in spaced apart parallel relation, a hollow shaft extending between said end plates, bearing means rotatably supporting the ends of said hollow shaft in said end plates, a spool rotatably mounted on said hollow shaft between said end plates, a clutch disposed within said second end plate adjacent to said spool and slidably keyed to said hollow shaft, means for fixing said hollow shaft and spool against axial movement toward said first end plate, a rod extending through said hollow shaft, resilient means on the one end of said rod in said second end plate for resiliently urging said clutch into frictional engagement with said spool, spring means opposing said resilient means for normally urging said clutch out of frictional engagement with said spool, means on said first end plate for rotating said hollow shaft, camming means on said first end plate for shifting said rod axially to vary the force which said resilient means exerts on said clutch, said camming means comprising a bushing rotatably and slidably mounted in said first end plate and disposed over said rod near the other end thereof, means fixing said bushing axially relative to said rod, a camming groove on said first end plate, a camming lever fixed to said bushing and projecting through said camming groove whereby the camming lever and groove cooperate to move said bushing and rod axially to vary the frictional engagement of said clutch against said spool when said camming lever is pivoted within said groove, stop means in said groove for stopping said camming lever after it has moved through less than the entire length of said camming groove, and means for enabling said camming lever to be pivoted past said stop means to the end of said groove.

8. In combination with a fishing reel having a clutch actuated by axial movement of a rod, a bushing rotatably and slidably mounted on said fishing reel and disposed over said rod, means for fixing said bushing axially relative to said rod, a camming groove on said fishing reel overlying said bushing, and a camming lever fixed to said bushing and projecting through said camming groove whereby the camming lever and groove cooperate to move said bushing and rod axially to actuate the clutch when said camming lever is pivoted within said camming groove, said means comprising an adjusting knob threaded on the end of said rod and abuttingly engaging one end of said bushing, and resilient means for biasing said rod to maintain said knob in abutting engagement with said one end of the bushing whereby rotation of the knob relative to said rod varies the axial position of the rod relative to said bushing to preset the maximum clutch actuating force obtainable by actuating said camming lever.

9. In a fishing reel, a body, a spool in said body, a drive for said spool supported by said body, a clutch disk in said drive movable to and from engagement with said spool, a rod for moving said clutch disk, cammable means, means for presetting the relationship of said rod with said clutch disk and cammable means, stop means for said cammable means for limiting the movement of said cammable means, rod and clutch disk, a second stop means for limiting the further movement of said cammable means, and means for rendering said first stop means ineffective to permit said cammable means to be advanced to said second stop means.

10. In a fishing reel, a body, a spool in said body, a drive for said spool supported by said body, a clutch disk in said drive movable to and from engagement with said spool, a rod for moving said clutch disk, movable cammable means for shifting said rod axially, means for presetting the axial relationship of said rod with said clutch disk and cammable means, stop means for said cammable means for limiting the movement of said cammable means, rod and clutch disk, said presetting means embodying a cylindrical nut threaded on said rod and disposed within a cylindrical aperture in said cammable means, and an annular rubberlike element compressed between the cylindrical surface of said nut and that of the aperture for retaining said nut in adjusted position.

11. In a fishing reel, a body having a pair of spaced plates, a hollow shaft journaled at its ends in said plates, a spool rotatably supported by said hollow shaft, an axially movable angularly adjustable rod within said spool, a nut on one end of said rod, a clutch operating means on the other end of said rod extending beyond the end of said hollow shaft, a drag clutch between said spool and clutch operating means, stop means, and cam means for angularly and axially moving said rod after said nut has adjusted said rod to a predetermined position when said cam means engages said stop means for moving said drag clutch against said spool with a force predetermined by the nut adjustment each time said cam means is moved against said stop means thereafter.

References Cited in the file of this patent

UNITED STATES PATENTS

| | | |
|---|---|---|
| 2,180,566 | Thompson | Nov. 21, 1939 |
| 2,190,398 | Bugatti | Feb. 13, 1940 |
| 2,209,598 | Coxe | July 30, 1940 |
| 2,282,995 | Dumond | May 12, 1942 |
| 2,298,481 | Hayes | Oct. 13, 1942 |
| 2,417,732 | Bland et al. | Mar. 18, 1947 |
| 2,462,365 | Crawford | Feb. 22, 1949 |
| 2,531,610 | Butzman | Nov. 28, 1950 |
| 2,731,214 | Bogar | Jan. 17, 1956 |
| 2,896,876 | Bogar | July 28, 1959 |
| 2,977,063 | Holahan | Mar. 28, 1961 |

FOREIGN PATENTS

| | | |
|---|---|---|
| 589,703 | France | Feb. 26, 1925 |